(12) United States Patent
Moor

(10) Patent No.: US 11,109,631 B2
(45) Date of Patent: Sep. 7, 2021

(54) DEVICE AND SYSTEM FOR DETECTING A FORCE

(71) Applicant: HP1 TECHNOLOGIES LIMITED, Newton Aycliffe (GB)

(72) Inventor: Timothy Nicholas Moor, Harrowgate (GB)

(73) Assignee: HP1 Technologies Limited, Newton Aycliffe (GB)

( * ) Notice: Subject to any disclaimer, the term of this patent is extended or adjusted under 35 U.S.C. 154(b) by 358 days.

(21) Appl. No.: 16/301,847

(22) PCT Filed: Mar. 10, 2017

(86) PCT No.: PCT/GB2017/050665
§ 371 (c)(1),
(2) Date: Nov. 15, 2018

(87) PCT Pub. No.: WO2017/198990
PCT Pub. Date: Nov. 23, 2017

(65) Prior Publication Data
US 2019/0142097 A1    May 16, 2019

(30) Foreign Application Priority Data
May 20, 2016   (GB) .................................... 1608867

(51) Int. Cl.
*A42B 3/04*    (2006.01)
*A43B 3/00*    (2006.01)
*G01L 1/20*    (2006.01)
*G01L 5/00*    (2006.01)
*A43B 17/00*   (2006.01)

(52) U.S. Cl.
CPC ............ *A42B 3/046* (2013.01); *A43B 3/0005* (2013.01); *G01L 1/205* (2013.01); *G01L 5/0052* (2013.01); *A43B 17/00* (2013.01)

(58) Field of Classification Search
None
See application file for complete search history.

(56) References Cited

U.S. PATENT DOCUMENTS

| 5,848,661 | A | 12/1998 | Fu |  |
|---|---|---|---|---|
| 8,127,373 | B1* | 3/2012 | Fodemski | A42B 3/121 2/413 |
| 8,196,226 | B1* | 6/2012 | Schuh | A42B 3/064 2/412 |
| 9,986,777 | B2* | 6/2018 | Morgan | A42B 1/046 |
| 10,244,810 | B2* | 4/2019 | Martin | A42B 3/046 |

(Continued)

OTHER PUBLICATIONS

International Searching Authority, "Written Opinion", in application No. PCT/GB2017/050665, dated May 20, 2016, 7 pages.

(Continued)

*Primary Examiner* — Daniel S Larkin
(74) *Attorney, Agent, or Firm* — Hickman Becker Bingham Ledesma LLP

(57) ABSTRACT

A device for detecting a force or pressure applied to an object is disclosed. The device (200) comprises a first flexible substrate layer (101) having a first plurality of pressure sensors (103) thereon; and a first plurality of electrically conductive tracks (102); wherein the first plurality of electrically conductive tracks are arranged to provide an electrical connection to the plurality of pressure sensors.

43 Claims, 9 Drawing Sheets

(56) References Cited

U.S. PATENT DOCUMENTS

| | | | |
|---|---|---|---|
| 2010/0176825 A1 | 7/2010 | Kim et al. | |
| 2011/0219852 A1* | 9/2011 | Kasten | G01L 5/0052 73/12.04 |
| 2013/0060168 A1 | 3/2013 | Chu et al. | |
| 2013/0303946 A1 | 11/2013 | Gettens et al. | |
| 2015/0230534 A1* | 8/2015 | McGuckin, Jr. | G01L 5/0052 2/411 |
| 2015/0359457 A1 | 12/2015 | Blumenthal et al. | |
| 2016/0050999 A1* | 2/2016 | Atashbar | A42B 3/0466 2/411 |

OTHER PUBLICATIONS

European Patent Office, "Search Report" in application No. PCT/GB2017/050665, dated Apr. 8, 2019, 5 pages.

* cited by examiner

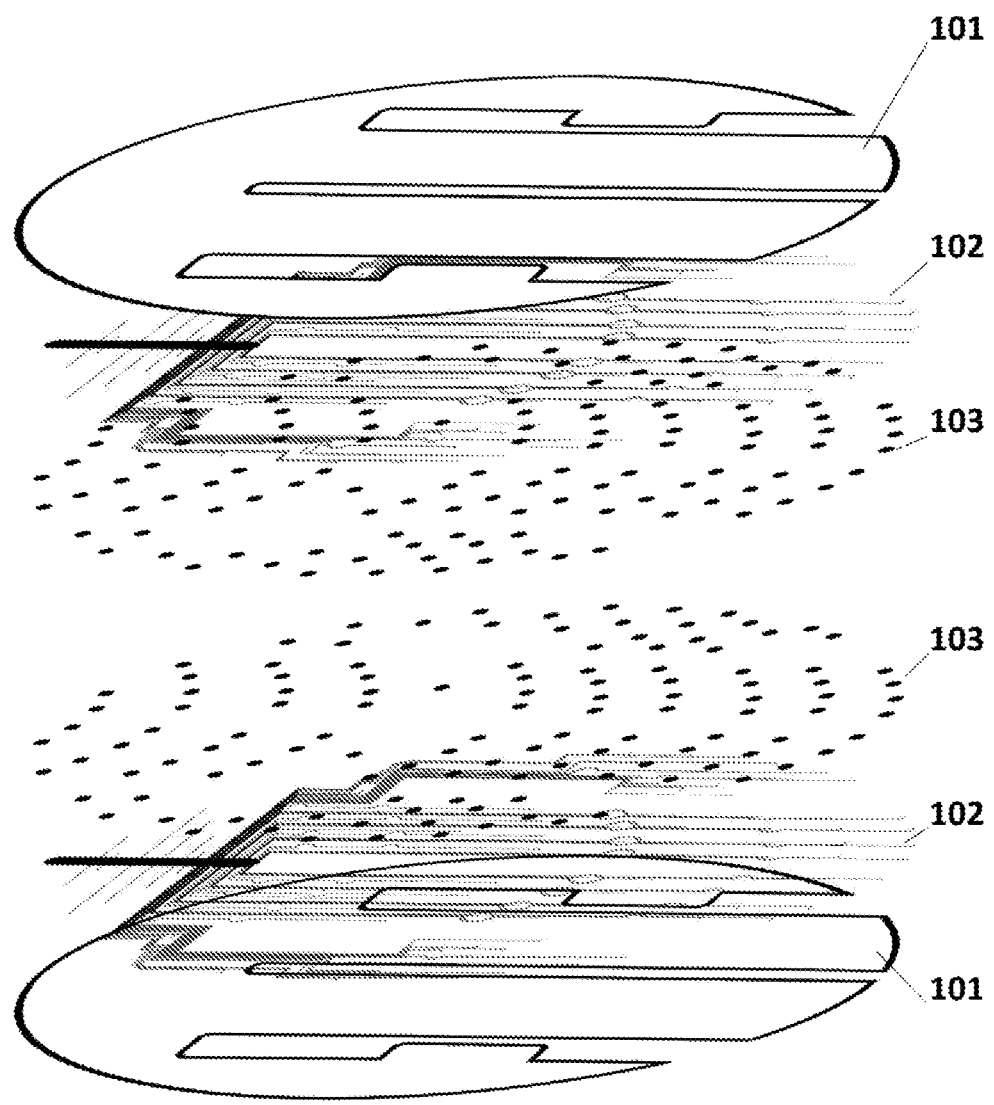
Figure 2        200

Figure 3    100, 200
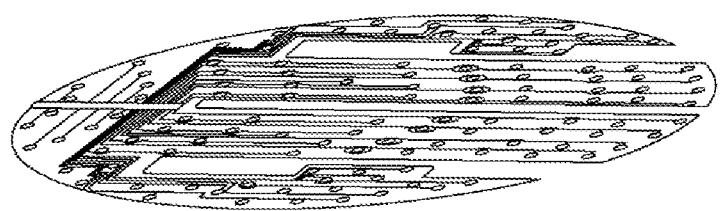
Figure 4    300
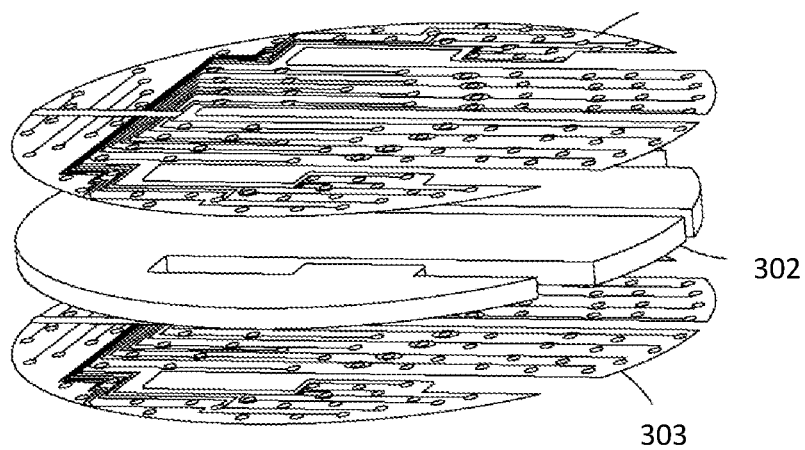
301
302
303

Figure 9
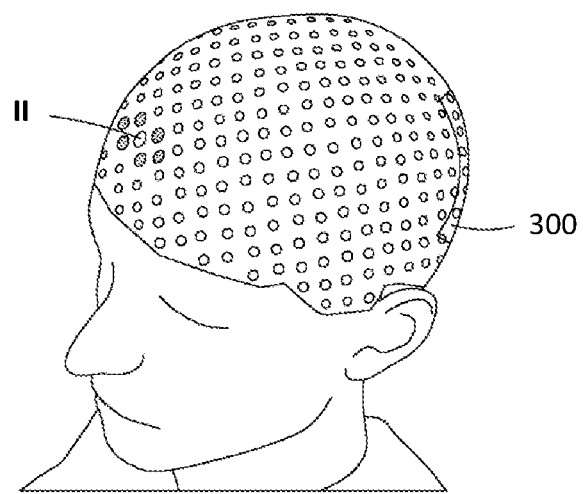
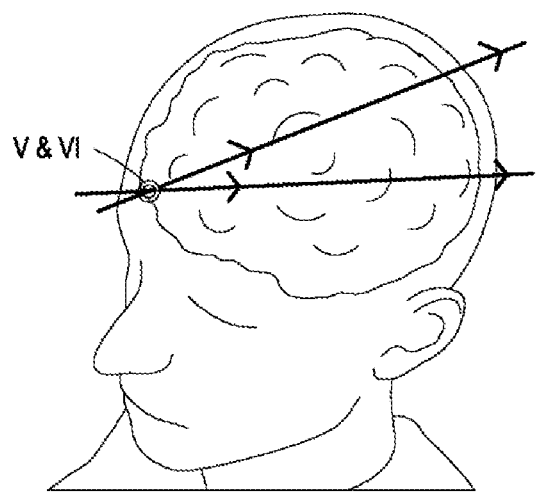

DEVICE AND SYSTEM FOR DETECTING A FORCE

FIELD

The invention relates to a device and system for detecting a force. In an embodiment, the invention relates to a device for detecting a force applied to an item of apparel. In another embodiment, the invention relates to a device for detecting a force applied to a vehicle.

BACKGROUND

It is accepted that helmets for recreational and sporting, commercial and professional use are known and well understood and can mitigate the severity of impact to the head. Additionally, protective apparel in general (gloves, boots, bodywear, and headwear) are known for mitigating the severity of impacts to any part of the body. As one example, the Transport Research Laboratory 2009 report describes the evidence substantiating this statement relating to cycle helmets.

Should an accident occur resulting in a Traumatic Brain Injury (TBI), the appropriate treatment of an acute brain injury is dependent on a number of key stages. Such stages include the pre-hospital admission phase, the initial triage phase and the subsequent intensive care and post intensive care treatment phases being on-going rehabilitation. Short term and longer term TBI problems can be mitigated by understanding more fully and accurately what happened at the time of impact to the head.

US 20120124720 A1, for American Football, discloses a system requiring solid sensors to be connected using solid wire connections and is limited in the biomechanical data it can generate. US2005177929 A1, also for American football helmets, provides limited biomechanical data and makes use of multiple accelerometers which can generate noise issues. US2014039355 A1 describes a system for real time monitoring, capturing a limited amount of biomechanical data. Such a system requires pre-loaded impact profiles. U52010005571 A1 discloses helmets for determining blast effects to the wearer. These helmets require sensors to be positioned externally to the helmet. US2012120009 A1 describes a touch screen pad for use with a finger to monitor lesser forces/impacts.

SUMMARY

An invention is set out in the claims.

In an embodiment, a device for detecting a force applied to a helmet is provided. The device comprises a first flexible substrate layer having a first plurality of pressure sensors thereon; and a first plurality of electrically conductive tracks; wherein the first plurality of electrically conductive tracks are arranged to provide an electrical connection to the plurality of pressure sensors.

In another embodiment, a device for detecting a force or pressure applied to an object is provided. The device comprises a first flexible substrate layer having a first plurality of pressure sensors thereon; and a first plurality of electrically conductive tracks; wherein the first plurality of electrically conductive tracks are arranged to provide an electrical connection to the plurality of pressure sensors.

Optionally, the object is a body part of a wearer of the device, for example the head or a foot.

Optionally, the object is a part of a vehicle, for example a headrest.

Optionally, the first plurality of electrically conductive tracks comprises a plurality of first electrodes and a plurality of second electrodes, each first electrode and each second electrode being in electrical contact with a single pressure sensor of the first plurality of pressure sensors.

Optionally, each first electrode is in physical contact with a first side of each pressure sensor, and each second electrode is in physical contact with a second side of each pressure sensor.

Optionally, the first side is opposite to the second side.

Optionally, the first plurality of pressure sensors forms a sensor layer. Optionally, the first plurality of pressure sensors comprises pressure sensitive ink.

Optionally, the pressure sensitive ink comprises printed or screen coated pressure sensitive ink spots, the ink spots being arranged to change electrical resistance in response to pressure changes.

Optionally, the first plurality of electrically conductive tracks forms a tracks layer.

Optionally, the tracks layer is located between the first substrate layer and the first plurality of pressure sensors.

Optionally, the first plurality of electrically conductive tracks are applied to the first substrate layer using any one of: solder, conductive adhesive, anisotropic conductive tape.

Optionally, the first plurality of electrically conductive tracks are printed on the first substrate layer using any one of the following printing processes: inkjet, screen, flexographic, gravure.

Optionally, the first plurality of electrically conductive tracks comprise one or more of copper, silver, aluminium and conductive carbon.

Optionally, the device comprises a first sealing layer for protecting the first plurality of electrically conductive tracks and/or the first pressure sensors.

Optionally, at least one pressure sensor of the first plurality of pressure sensors is circular. Optionally, at least one pressure sensor of the first plurality of pressure sensors is volcano-shaped, dome-shaped or donut-shaped.

Optionally, the device further comprises: a second flexible substrate layer having a second plurality of pressure sensors thereon; and a second plurality of electrically conductive tracks, the second plurality of electrically conductive tracks being arranged to provide an electrical connection to the second plurality of pressure sensors.

Optionally, the second plurality of pressure sensors are in physical and electrical contact with the first plurality of pressure sensors.

Optionally, the second plurality of electrically conductive tracks forms a second tracks layer, the second plurality of pressure sensors comprise pressure sensitive ink, and the pressure sensitive ink comprises printed or screen coated pressure sensitive ink spots, the ink spots being arranged to change electrical resistance in response to pressure changes.

Optionally, the second tracks layer is located between the second substrate layer and the second plurality of pressure sensors.

Optionally, the device is formed as a single layer comprising the following six layers: the first substrate layer, the first plurality of sensors as a first sensor layer, the first plurality of electrically conductive tracks as a first tracks layer, the second substrate layer, the second plurality of sensors as a second sensor layer, and the second plurality of electrically conductive tracks as a second tracks layer.

Optionally, the device comprises one or more dielectric layers to provide electrical insulation between the first plurality of electrically conductive tracks and the second plurality of electrically conductive tracks.

Optionally, the device is formed as a single layer comprising the following eight layers: the first substrate layer, the first plurality of sensors as a first sensor layer, a first dielectric layer, the first plurality of electrically conductive tracks as a first tracks layer, the second substrate layer, the second plurality of sensors as a second sensor layer, a second dielectric layer and the second plurality of electrically conductive tracks as a second tracks layer.

Optionally, the device further comprises a processor, the processor being configured to determine a location of an impact, and/or a magnitude or force of an impact based on data received from the first plurality of pressure sensors.

Optionally, the processor is further configured to control analogue-to-digital conversion circuitry or arranged to be electrically connected to an analogue-to-digital converter.

Optionally, the processor is further configured to: monitor data received from the first plurality of pressure sensors; compare a pressure or force value associated with the data with a first predetermined threshold; and if the pressure or force value exceeds the first predetermined threshold, assign a time and/or date stamp; and optionally wherein the device further comprises means for recording and storing the data as raw data or processed data.

Optionally, the processor is configured to monitor data received from a combination of the first and second plurality of pressure sensors.

Optionally, the processor is further configured to assign a first time and/or date stamp for a first instance that the first predetermined threshold is exceeded, and assign a second time and/or date stamp for a second instance that the first predetermined threshold is exceeded, the first and second instances occurring at different times.

Optionally, the processor is arranged to transmit a signal indicative of the first predetermined threshold being exceeded, the signal including the time and/or date stamp, and optionally wherein the processor is further arranged to transmit data for a period before and/or after the first predetermined threshold is exceeded.

Optionally, the processor is further arranged to: compare the pressure or force value with a second predetermined threshold, the second predetermined threshold having a lower value than the first predetermined threshold; and if the pressure or force value is between the first predetermined threshold and the second predetermined threshold, provide a signal to indicate that the second predetermined threshold has been exceeded.

Also disclosed herein is a system comprising two such devices, one device being a first device and the other device being a second device, wherein the system further comprises a gap layer arranged between the first and second devices. Optionally, the gap layer comprises a cushion layer.

Optionally, the system further comprises a processor, the processor being configured to determine an angle or direction of a detected force or pressure based on a comparison of data received from the first device and data received from the second device.

Optionally, the processor is further configured to determine a magnitude of a force or pressure transferred through the gap layer, based on a comparison of the data received from the first device and the second device.

Optionally, the processor is further configured to determine a change in direction of force through the gap layer, based on a comparison of the data received from the first device and the second device.

Optionally, the processor is further configured to determine a magnitude and location of a force or pressure impact based on data received from the first device, and determine a magnitude and location of a force or pressure exiting the gap layer based on the data received from the second device.

Optionally, the gap layer comprises a test material for materials analysis testing, or an energy management material.

Optionally, the device or system further comprises a power source arranged to provide electrical power to the device, and optionally further comprising means to allow recharging of the power source.

Optionally, the device or system further comprises communication means to transmit at least one of pressure, location or force data to an external device for storage or analysis. Optionally, the external device is a mobile wireless communications device or a server.

Optionally, the pressure, location or force data is suitable for use in medical, insurance, sports health and performance analysis, medico-legal cases, statements, materials testing and analysis and certification.

Optionally, the communication means comprises wireless communication means, optionally Bluetooth.

Optionally, the device or system further comprises one or more gyroscopes and/or accelerometers.

Optionally, the device or system further comprises a processor being configured to determine rotational forces applied to the head of a wearer of the helmet based on data provided by the one or more gyroscopes and/or accelerometers.

Optionally, the processor is further configured to determine speed of movement of the helmet, and/or further configured to determine movement of the helmet relative to a body of the wearer and a predefined position of the head of the wearer, based on data provided by the one or more gyroscopes and/or accelerometers.

Optionally, the first plurality of electrically conductive tracks comprises a first connection point for electrical connection to an external device.

Optionally, the second plurality of electrically conductive tracks comprises a second connection point for electrical connection to an external device Optionally, the external device is an analogue-to-digital converter.

Optionally, the external device is a processor, optionally a microprocessor.

Optionally, the device or system further comprises an indicator to display a power level of the device or system.

Optionally, processing and/or power means are contained in a housing.

Optionally, the device or system further comprises means to receive and store personal data relating to a wearer of the helmet. Optionally, the personal data comprises personal details and/or medical information. Optionally, the medical information comprises one or more of allergy information, blood type, NHS number, emergency contact details, next of kin.

Optionally, the device or system is arranged to form an inner lining of a helmet.

Optionally, the device is arranged to form part of an insole for footwear.

Also disclosed herein is footwear or an insole including the device or system.

Also disclosed herein is a helmet including the device or system. Optionally, the device or system is arranged at least partly between layers of the helmet. Optionally, the helmet is for sport, recreational pursuits, professional practice, exploration, cycling, rock climbing, ice hockey, American football, motor sports, water sports, snow sports, horse riding, kayaking, rugby, skiing, martial arts, boxing, construction work, rugby, cricket, training, performance work, safety.

Also disclosed herein is clothing including the device or system.

Also disclosed herein is protective apparel including the device or system. Optionally, the protective apparel is body armour.

Also disclosed herein is an app arranged to communicate with the communication means, the app being configured to react in response to receiving the pressure or force data. Optionally, the app automatically contacts emergency services in response to receiving the pressure or force data. Optionally, the app automatically contacts emergency services in response to receiving a signal indicative of the force value exceeding the first predetermined threshold. Optionally, the app provides an alert in response to receiving a signal indicative of the force value exceeding the second predetermined threshold.

In an embodiment, a method of detecting a force or pressure applied to an object is provided. The method comprises providing the device; monitoring, using the processor, data received from the first plurality of pressure sensors; comparing, using the processor, a pressure or force value associated with the data with a first predetermined threshold; and if the pressure or force value exceeds the first predetermined threshold, assigning a time and/or date stamp.

Optionally, the monitoring comprises monitoring data received from a combination of the first and second plurality of pressure sensors.

BRIEF DESCRIPTION OF THE DRAWINGS

Embodiments of the invention will now be described, by way of example, with reference to the drawings, of which:

FIG. 2 shows an exploded view of an embodiment of a device comprising a six layered integrated layering system;

FIG. 3 shows the device of FIG. 1 or FIG. 2 after construction;

FIG. 4 shows an exploded view of an embodiment of a system comprising two integrated layering systems (two of the device of FIG. 1, or two of the device of FIG. 2);

FIG. 9 shows example graphical representations showing the location of linear impact(s), the linear path force(s) takes through the head, and the linear path force(s) takes through the brain;

Throughout the description and drawings, like reference numerals refer to like parts.

DESCRIPTION

Figure 1:
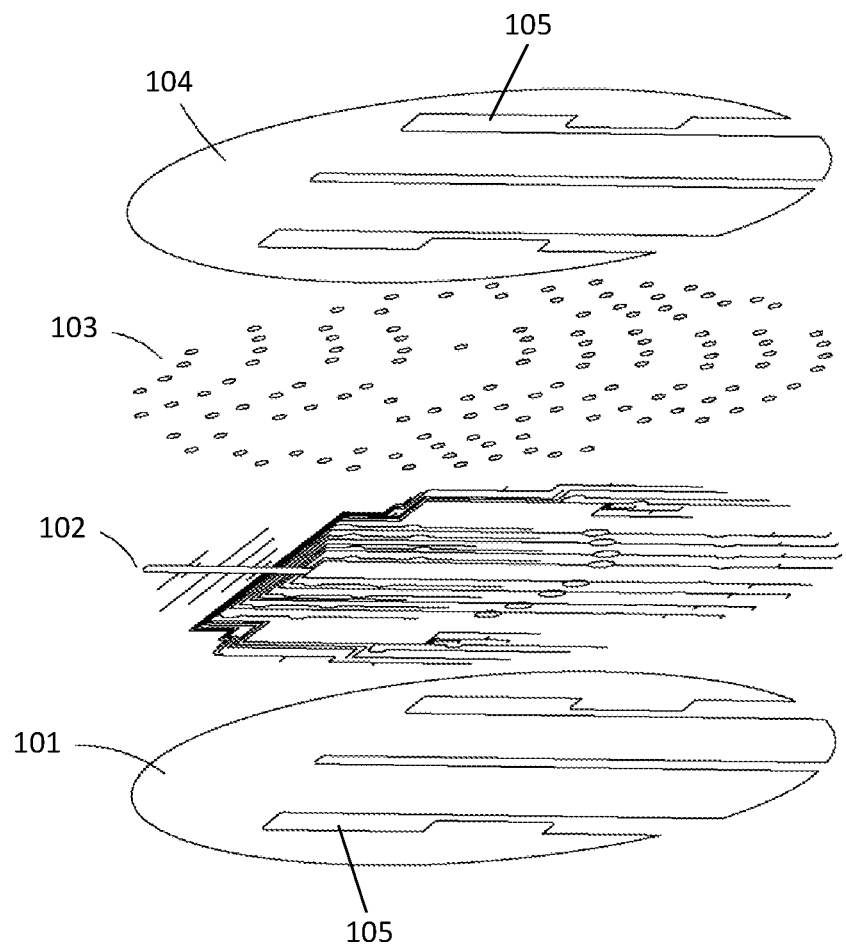
FIG. 1 shows an exploded view of an embodiment of a device comprising a four layered integrated layering system.

This invention relates to improvements in the detection of force or pressure applied to an object. In one embodiment, the invention relates to a device representing an improvement in helmet technology, the device being capable of capturing event data and biomechanical data either at the point of injury or impact and/or leading up to the event and shortly after, thereby providing a clearer and more comprehensive picture. The captured data is useful in many applications.

While the specific example of a helmet is discussed as an example use of the invention, many other uses are also possible. For example, the invention may also be used to detect a force or a pressure applied to any apparel, such as any clothing or accessories worn on the body. This includes headwear, bodywear, footwear and protective apparel. Specifically, the invention could be used in a boot to detect force or pressure applied to a sole of a shoe, or in a protective helmet to detect force or pressure applied to a helmet. In this disclosure, the word "apparel" is used to include anything that can be worn by a person, including hats/helmets, gloves, socks and shoes of any kind.

Indeed, the invention may be beneficially used to detect a force or pressure applied to any object or surface. For example, the invention could be used in the context of vehicles. Specifically, the invention could be used to detect pressure of force applied to a headrest of a vehicle, or indeed any other part of a vehicle.

The invention also provides means to determine performance levels and data under testing conditions for energy management materials.

Disclosed herein is an improvement in force detection technology. Particularly, at present there is no efficient and accurate manner of determining an angle of force hitting an object, or the linear path a force takes through an object, such as the head of a helmet wearer. For brevity, the technology's use in relation to helmets will be described, however it would be understood that the technology could be applied to any application in which it is desirable to detect a force or a pressure applied to or through any surface or object.

A device will now be described which may typically be used with or as part of a helmet. The device includes one or more flexible printed ink sensor circuits capable of capturing part of the biomechanical information required, the level/magnitude of force(s) and the location of force(s) received by an object. Optionally, in the case that the device includes a second device also having one or more flexible printed ink sensor circuits capable of capturing part of the biomechanical information required, a linear path(s)/angle(s) of force may also be captured. A system including two devices each having such printed flexible ink sensor circuits may include the following layers (for example, each device having a substrate, tracks, sensors and optional protective lamination layers):

TOP
    Protective lamination
    Sensors
    Tracks
    Substrate
    Cushion layer (separator)
    Sensors
    Tracks
    Substrate
BOTTOM The system includes a combination of these layers, which may be referred to as an integrated layering system comprising flexible printed electronics with pressure ink sensors. The purpose of the integrated layering system is to capture impact data determining an accurate location(s) of impact, force of impact(s) and, in the case of two devices being used as above (two sensor layers), linear path(s) of impact force.

The layer construction starts with a substrate layer typically between 25 μm to 250 μm thickness. Any flexible material film can be used, however a thin film flexible plastic and/or polymer with a thickness of around 100 μm-125 μm, which can be printed on the upper surface, is preferred. Preferably, the thickness of the substrate layer is 100 μm. Preferably, the thickness of the substrate layer is 50 μm. It is further preferred that the substrate is transparent or translucent. The substrate layers may be made of PET.

A tracks layer comprises the electrical connections between sensors of a sensors layer and a processor, optionally via connection to an A/D converter. Tracks can be applied to the substrate layer using low-temperature solders (bismuth and/or tin as examples), conductive adhesive or anisotropic conductive tape and the like. The track materials can be any conductive material, preferably silver, or indeed copper, aluminium or conductive carbons. In a preferred embodiment, the track materials is printed using inkjet, screen, flexographic, gravure and other similar printing processes.

The sensors layer can comprise any combination of sensors disclosed herein, but preferably this layer is screen coated pressure ink spot sensors only. Any known pressure sensitive ink may be used as the pressure ink spot sensors. The sensors layer may also be termed a piezoresistive layer since, as the skilled person would understand, each individual ink spot sensor has piezoresistive properties. An increase in the pressure applied to the sensor gives rise to a decrease in resistance. The use of pressure ink sensors allows individual sensors to be located very closely together, providing a more accurate reading of force or pressure. The ink can be any electrically conductive printable ink, including screen coated or other material with the key function of registering an analogue change in resistance when subject to mechanical strain. The pressure ink materials may be any type of carbon nanotubes (CNT), quantum tunnelling conductance, graphene and/or piezo-electric materials as examples.

The ink spots may be formed of functionalised graphene nanoparticles (GNP), such as the ink produced by Haydale and described in WO2016/102689A1 (particularly page 5 lines 26-36, and page 9 line 24 to page 10 line 9). The ink spots of such an ink are formed of carbon nanoparticles dispersed in a polymer matrix material. The carbon particles have a high aspect ratio, as this increases the resistance sensitivity of the ink. The ink spots may have a high resistance in the absence of an applied force, such that current flow in the absence of applied force is negligible. There may also be effectively no lateral conductivity in the graphene ink particles. However, the ink becomes conductive when the structure of the particles is compressed. Another example pressure sensitive ink is that made by Peratech. More information on Peratech is available on the Internet in the peratech.com domain.

As the skilled person would understand, a piezoresistive sensor changes resistance when subject to mechanical strain. The skilled person would also understand how such a change in resistance could be detected, which may include using a potential divider, for example. A calibration step may also be used to determine the relationship between resistance change and mechanical strain. This may be by applying a known force to the sensor and measuring the resistance, and using this data for calibration.

The number of sensors can vary greatly, and depends on the specific application. For example, 64 or 128 ink sensors could be used.

The size of the ink spots (sensors) can be any size and can vary depending upon the specific use. For example, the size of the ink spots can vary depending on the helmet type and application. The track technology currently used creates gaps of 70 μm, enabling the smallest ink spot diameter to be 210 μm. The effective range of ink spot diameters is between 3 mm to 15 mm, and a diameter of between 5 to 10 mm may be used. For example, the ink spots may have a diameter of around 14 mm. The shape of the coated ink sensors can be any shape, and preferably a circular shape. Additionally, each sensor on the same sensors layer is preferably a uniform shape and size for stability reasons. The shape height of the ink sensor is preferred to be either domed, volcano-like or donut shaped, which is the natural drying shape of ink, however this form can also assist in stopping current bleeding from an 'off' position. The distance between sensors relates to the minimum noise levels generated and the footprint of the apparel or surface, such as the footprint of a helmet.

In the case of the sensors being pressure ink sensors, multiple printings of each sensor could be applied. For example, a single sensor may comprise two or more layers of ink, each layer being directly applied on top of the previous ink layer. As such, a single sensor may be formed of multiple layers of ink. By using multiple layers, the ink sensor is thicker and therefore the piezo resistive range is increased. As such, higher forces can be measured. Preferably, each ink sensor comprises four printed ink sensor layers, however other numbers of layers may be used and may vary depending on the specific ink.

The protective lamination layer provides a seal layer which can be made from any flexible material, preferably a thin film plastic or the like. In one embodiment, it is possible for a device to have the substrate, tracks, sensors and protective lamination layers only. This is particularly useful for materials testing, for example. In a preferred embodiment for integration into helmets, a cushion layer is also used which separates two sets of substrate, tracks and sensors layers as shown above (i.e. two separate devices). The cushion layer can be any thickness depending on the application. For example, the cushion layer could be from 0.1 mm up to 30 mm, preferably between 1 mm to 10 mm and most preferably between 5 mm to 10 mm. The material of the cushion layer can be any flexible material, such as silicon or TPE. Equally, the material of the cushion layer may be an energy management material to help impact absorption such as crushable foams (e.g. expanded polystyrene and/or expanded polypropylene), non-Newtonian foams and the like.

In an embodiment, the system comprises eight layers as shown above, with the bottom layer being a substrate layer, and the top layer being a protective lamination layer. This embodiment enables the linear path of the force to be determined. Alternatively, two sets of the four layers (i.e. two devices) described located above and below each other with a gap or the cushion layer can also provide the same data. The gap may incorporate a third party material.

FIG. 1 shows an exploded view of an embodiment of a device 100 comprising four layers: a substrate layer 101, a tracks layer 102, a pressure sensing layer formed as a sensors layer 103 and a protective layer 104. The device 100 of FIG. 1 is an example footprint of a device for integration within a cycling helmet design. The footprint of FIG. 1 can be any size and shape including, and not limited to, solid polygons and circles. Such solid polygons or circles may include cut out sections 105 being shaped as polygons and/or circles. The sensors layer 103 may be formed of printed pressure ink sensors.

While FIG. 1 shows a device comprising four layers, it is to be understood that in all embodiments disclosed herein the protective layer 104 may be omitted if it is unnecessary. As such, the protective layer 104 is optional, and three layers may be used.

Such three layers may only represent half of the layers in the device. In particular, the device may have six layers such as the device 200 shown in FIG. 2. Such a device 200 may have the following structure:

TOP
   Substrate
   Tracks
   Sensors
   Sensors
   Tracks
   Substrate
BOTTOM

In other words, the device 200 may have two substrate layers 101, two tracks layers 102 and two sensor layers 103. The two sensors layers 103 form a pressures sensing layer. The layers may be arranged in the order shown above, such that the two sensor layers 103 are in physical contact. As previously stated, one or more protective layers 105 may also be used in the above arrangement depending on the application, and such a protective layer 105 may be provided on the top, the bottom or both. The sensor layers 103 may be arranged such that the individual pressure ink sensors of one sensor layer 103 contact the individual pressure ink sensors of the other sensor layer 103.

In the case that the device is the device 100 which has only a single sensors layer 103, as in the three or four layered arrangements previously described, the tracks of the tracks layer 102 may be shaped such that they form two electrodes for each ink spot sensor of the sensors layer 103. Therefore, in the device 100, a single sensor layer 103 (piezoresistive layer) is used as a pressure sensing layer. One side of each ink spot sensor has a first tracks electrode, and another side of each ink spot sensor has a second tracks electrode. Such a configuration may be made by forming the first and second tracks electrode as part of the tracks layer 102, and then printing an ink spot sensor directly on top of the two electrodes. The electrodes may therefore be in the same plane. The first and second tracks electrodes may be inter-digitated electrodes, for example. By having two track electrodes, the resistance between two points can be measured. As would be understood, in the case of the ink spot sensors being graphene, when a force is applied to the ink sensor, displacement of the graphene ink particles due to the pressure causes a resistance change across the sensor. Such a resistance change could be measured by any conventional means.

In the case that the device is the device 200, there are two sensors layers 103. As previously mentioned, a sensor layer may be termed a piezoresistive layer, and as such the device 200 has two piezoresistive layers. Unlike the device 100, in the device 200 the pressure sensing layer is therefore formed of two sensors layers 103 (piezoresistive layers). In the case of the device 200, direct contact between these two piezoresistive layers is used for pressure sensing. In order to measure resistance, the ink spots of one sensor layer 103 come into contact with the ink spots of the other sensor layer 103. Direct contact between the ink spots of the two sensor layers 103 creates a known resistance value which decreases as the force applied increases. The piezoresistive range increases with the thickness of each layer of ink used for the ink spots, and the rate at which the resistance decreases depends on the number of layers of ink per ink spot. Depending on the specific ink used, for example the ink created by Haydale, it may be the case that the ink spot of one sensor layer only becomes conductive when in contact with an opposing ink spot of an opposite sensor layer. This arrangement is therefore particularly beneficial for such inks.

In the device 200, one tracks layer 102 forms a first tracks electrode electrically connected to each ink spot of its corresponding sensor layer 103, and the other tracks layer 102 similarly forms a second tracks electrode for its corresponding sensor layer 103. As such, the tracks layers 102 form electrodes for the pressure sensing layer. The contact and compressing together of these two sensors layers completes an electrical circuit and causes compression of the ink spots, creating a lower resistance measurement when measured using the first and second tracks electrodes in conjunction with any convention resistance value detecting means. For example, a potential divider may be used to compare a voltage drop across the pressure sensing layer when it is connected in series with another known resistance or resistor. The changes in resistance have a linear dependence on the force applied to the pressure sensing layer.

The device 200 may also include one or more dielectric layers (not shown). The device 200 comprises six layers and, in the specific example shown in FIG. 2, the configuration of the tracks layers 102 are the same. In other words, the tracks of one tracks layer 102 overlap the tracks of the other tracks layer 102. In this case, one or more a dielectric layers would be included to prevent electrical shorting that would occur when the two tracks layers come into physical, and therefore electrical, contact. The dielectric layer(s) may be printed after the tracks layers at any stage, and may comprise dielectric ink. Such a dielectric layer would have holes therein such that the printed ink sensors are not covered, thereby ensuring electrical contact between the two sensor layers. There may be one dielectric layer to cover one of the upper or lower tracks layer, and optionally there may be a second dielectric layer to cover the other of the upper or lower tracks layer as well. In other words, the device 200 may comprise seven layers if a single dielectric layer is included, or may comprise eight layers if two dielectric layers are included. Indeed, the device 200 may have additional layers if one or more protective layers are also to be included.

Alternatively however, the dielectric layer(s) could be omitted entirely if the tracks layers 102 are printed in such a way that they do not overlay and physically (and electrically) contact each other (not shown).

FIG. 3 shows the device 100 or 200 after construction. The device 100 may comprises three or four layers, and the device 200 may comprise six or more layers as described above. The layers of the device 100 or 200 are bonded together using an adhesive, such as a 3M adhesive. The adhesive bonding may be such that a watertight seal is created over the layers. As described above, the device may have additional layers if necessary (protective layer(s) and/or dielectric layer(s)). However, singles or multiples of these devices may be used as a device for integration in helmets and/or materials testing. Alternatively, the device/system may be used to detect a force or pressure applied to any surface, such as any apparel to be worn by a user (including footwear) or in the interior or exterior of a vehicle. Indeed, many other uses may be apparent to the skilled person. The device 100 or 200 can be conveniently located, and optionally means can be used to secure the device above and below third party materials, such as energy management materials. Such a securement can be permanent or temporary. One or more devices can be used in this way.

FIG. 4 shows an exploded view of an embodiment of a system 300 comprising two devices 301 and 303 separated by a cushion layer 302. Each device 301, 303 could be the same as the device 100 of FIG. 3, e.g. a three or four layered device, or could be the same as the device 200 of FIG. 2, e.g. a six, seven, eight or more layered device. The system 300 therefore comprises six, seven, eight, twelve, fourteen, sixteen or more layers provided by the combination of a top device 301 and a bottom device 303. The number of layers of the system 300 depends on which of the devices 100 or 200 is chosen for the devices 301 and 303, and the number of layers of these devices.

The system 300 may for example comprise the device 100 as each of the devices 301 and 303. Such a system 300 would therefore comprise, in total, two substrate layers 101, two track layers 102, two printed pressure ink sensors layers 103, and an additional cushion layer 302 sandwiched in between the devices 301, 303 (devices 100) with a protective lamination layer 104 added at the top of the top device 301, as shown in FIG. 4. Optionally, a second protective lamination layer 104 may be located underneath the cushion layer 302, i.e. between the bottom device 301 and the cushion layer 302. Alternatively, the top device 301 may comprise the device 200 (the six or more layered device) described above, with optional dielectric layer(s) and protective layer(s). Similarly, the bottom device 303 may also comprise the device 200 described above, with optional dielectric layer(s) and protective layer(s). Indeed, the top and bottom devices 301 and 303 may comprise the same layout of layers.

Figure 5:
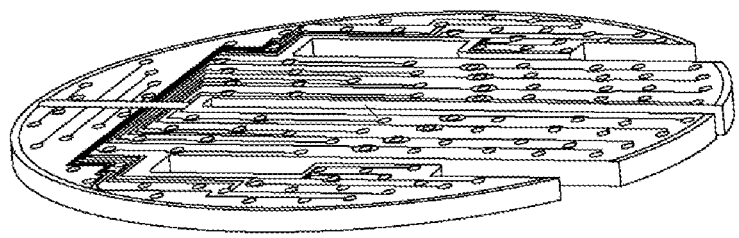
FIG. 5 shows the system of FIG. 3 after construction.

FIG. 5 shows the system 300 of FIG. 3 after construction. The top and bottom devices 301 and 303 are shown on either side of the cushion layer 302. The system 300 may be such that the individual sensors of the sensor layer(s) of the top device 301 align with the individual sensors of the sensor layer(s) of the bottom device 303.

In any of the above embodiments, the devices or system may comprise multiple sets of devices, or may be a single set and/or in combinations of differing devices. The device or system may not be removable once integral to a helmet for example, and pre-loaded impact profiles are not required.

The track and sensor layers (102, 103) may have different layouts enabling more accurate determination of the force's linear path. However, in some applications it may be beneficial to have layers 102 and 103 overlapping with the same layout design.

Different configurations and patterns of sensors and tracks are possible, as are differently shaped substrate, cushion and laminate layers of the device/system enabling integration to any helmet, other apparel or surface design. In the case of the device 100 or 200 for example, the location of the device can either be between an outer shell and an energy management material of a helmet, other apparel or surface, or the device could be underneath the energy management material. Optionally there could be devices located both above and below the energy management layers, as shown in the example system 300. The use of an energy management layer, such as the cushion layer 302, is particularly useful if the magnitude of a force transferred to the head, body or surface is required. A single device or a plurality of devices may be used which may include the combinations and configurations described above.

Figure 6:
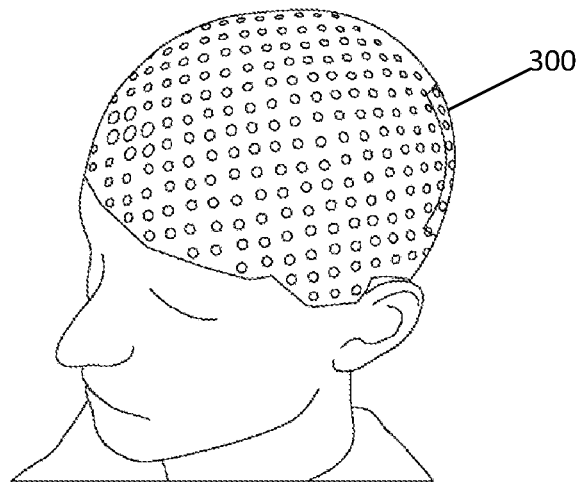
FIG. 6 shows an embodiment in which the system of FIG. 5 is used as part of or in conjunction with a helmet.

FIG. 6 shows an embodiment in which the system 300 of FIG. 4 is used as part of or in conjunction with a helmet. The footprint and/or layout of the devices of the system 300 is shown for use as a skull cap in a helmet. The figure demonstrates the flexibility of the layers of the devices. The figure also shows that the devices/system is devoid of any solid objects for the majority of the helmet. The outer layer of the skull cap is not shown. The skull cap may comprise the system 300 encased in either a polymer or textile material shaped to fit a wearer's head. The skull cap may also include Velcro or other fixing means to secure the skull cap to a helmet, as an inner lining. Alternatively, the skull cap may comprise the system 300 encased in a stretchable polymer material, such as TPE, similar to a conventional swimming cap.

Analogue signals from the sensors on the sensor layers 103 are received via the tracks in track layers 102 in the device/system. The device/system may have exposed connection points at the point where a connection can be made to the A/D convertor or directly to a microprocessor on the track layers 102. The rest of the device/system may be encased or housed in an additional material for further protection, and to increase the comfort of a wearer of apparel incorporating the device/system. The materials may be silicon, TPE or other similar material, and may be moulded in such a way as to form a casing or outer housing for the device/system.

In an embodiment, the track layers 102 and the sensor layers 103 may be rearranged so that the ink is printed before the tracks are applied.

Using the devices 100, 200 or the system 300 having the disclosed integrated layering system(s), the following data can be achieved:

Accurate location of impact(s)
Magnitude of impact(s) and/or force
Angle and/or direction of a linear force's path(s)
Magnitude of force transferred onwards through a material(s) (in the case of a device being located both above and underneath energy management material(s), for example the system 300)
Alteration or change of a linear force's path(s) direction through energy management material (in the case of a device being located both above and underneath energy management material(s), for example the system 300)

The pressure sensitive ink spots of the sensor layers 103 detect pressure differences by detecting changes in resistance values. The resistance values vary on the same layer depending on where the force impacted the device/system. A processor reads the resistance values and can determine the location of the force on a helmet, other apparel or surface based on the resistance values. The differing values/resistance levels of the pressure sensitive ink spots allow more accurate determination of the shape of the force, concentration and magnitude of the impact. One or more second printed pressure sensitive ink layer(s) (second sensor layer(s) 103) underneath will provide its own change in resistance values enabling the processor to determine the angle/linear path of the force being passed through the sensor layers. Such a determination can be made by comparing a difference in the location of resistance value changes on one sensor layer compared to another sensor layer, as would be understood by the skilled person. For example, a line connecting the location of maximum resistance change in one layer or set of layers to the location of maximum resistance change in another layer or set of layers provides a linear path of force and therefore an angle of force. In the specific case of a helmet, this enables the processor to determine the angle/linear path of the force being passed through to the head and the brain.

To enable the device or system to function remotely, the minimum circuit requirements are now described with reference to a circuit 600 shown in FIG. 7.

Figure 7:
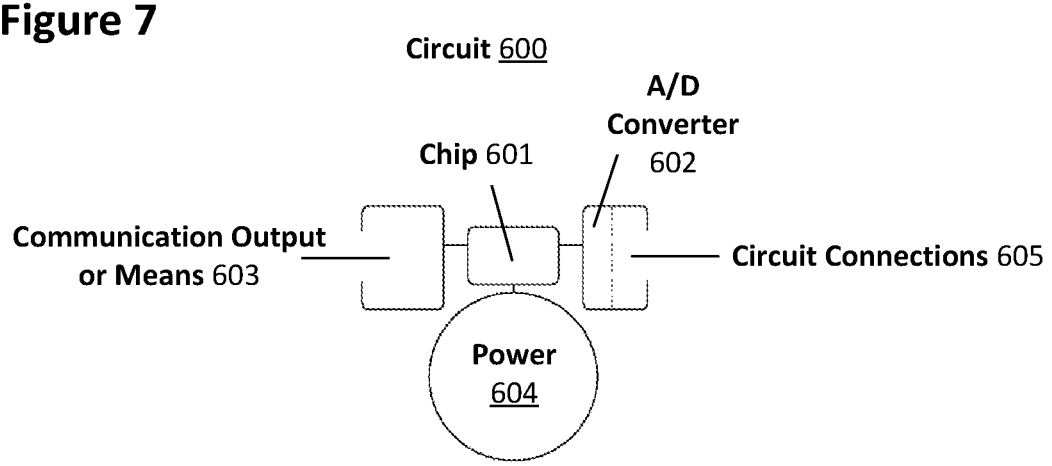
FIG. 7 shows an embodiment of a circuit for processing data provided by an integrated layering system.

- Digital processing chip 601 with embedded software to control circuits with either Analogue to Digital (A/D) conversion capability or optionally with a connection to an A/D converter chip 602
- Communication output or communication means 603 (e.g. USB, SD card and/or Bluetooth and the like)
- Power source 604 (for example coin cell battery(s) and/or rechargeable coin cell batteries and the like)
- Circuit connections 605 including connection to the device(s) previously described FIG. 7 only Illustrates an example configuration of the circuit for processing a device/system data, and other configurations may be used.

In an embodiment, the A/D converter chip 602 is located next to the connection points (circuit connections 605) of the device/system. The A/D converter chip 602 is then connected to the digital processing chip 601. Alternatively the digital processing chip 601 may be connected directly to the device/system. Either way, the digital processing chip 601 can be any chip with the capability of performing the necessary functions. For example, the processing chip 601 could sample signals received from the sensors at a predetermined rate. Such sampled signals could then be interpreted by software to give a corresponding Newton force value, thereby indicating the magnitude of the force that gave rise to the changes in resistance of the sensors. A preferred processing chip is the STM32 4-7 range. The processing chip may have embedded software written using C+, C++ or Python programming languages, for example. The software interprets, manages and transfers data and operates and controls the overall circuit 600 as would be understood. The software may also run safety checks providing necessary alerts as will be explained.

One of the functions of the processing chip 601 is to establish a sequence of timed events with a date stamp and to record the data captured over this time from some or all of the sensors. The overall circuit 600 functions similarly to black box technology by recording the latest period of readings from sensors leading up to an impact event, the impact event itself and for a time period shortly after the impact event. This set of data may be recorded the instant an impact is registered by the device/system as being above a pre-defined threshold relating to force/pressure of impact. Such a threshold may be, for example, 100N. Depending upon the application, as an example the data may be recorded for: (1) a period of between 10 to 20 seconds before the impact, (2) a period corresponding to the impact event itself, and (3) for a period of between 10 to 20 seconds following the impact event. These durations are provided to give a clear example of the time periods, however other time periods may of course be used. The circuit 600 may be constantly monitoring for impacts exceeding a threshold and, when one or more impacts exceed the threshold, the data (1), (2) and (3) may be recorded for each impact.

More than one impact event may be recorded if the threshold is exceeded more than once. For example, a subsequent impact event may occur a short duration after a first impact event. In this case, data may be recorded for both impact events in the same manner as described above. Such a recording of two separate impact events allows a clearer picture to be built up of what actually happened. For example, a wearer of a helmet that incorporates the device or system may receive a first impact from a car, and a subsequent impact from the road. If both impacts exceed the threshold, then both may be recorded and as such deemed to be significant. By providing data for multiple impacts, emergency services on the scene or after would have a greater understanding of the possible injuries sustained by the wearer.

The power requirements of the device/system can vary depending upon the specific application. Preferably, rechargeable coin cell batteries are used. As an example, in the case of a cyclist using the device/system as part of or in conjunction with a protective cycle helmet, the circuit 600 will need to be operable and "on" for the duration of the cycle ride, which could be up to 8 hrs 'saddle time' for long distance cycling. The circuit 600 may include a single battery or multiple batteries, preferably 4, 6 or 8.

Figure 8:
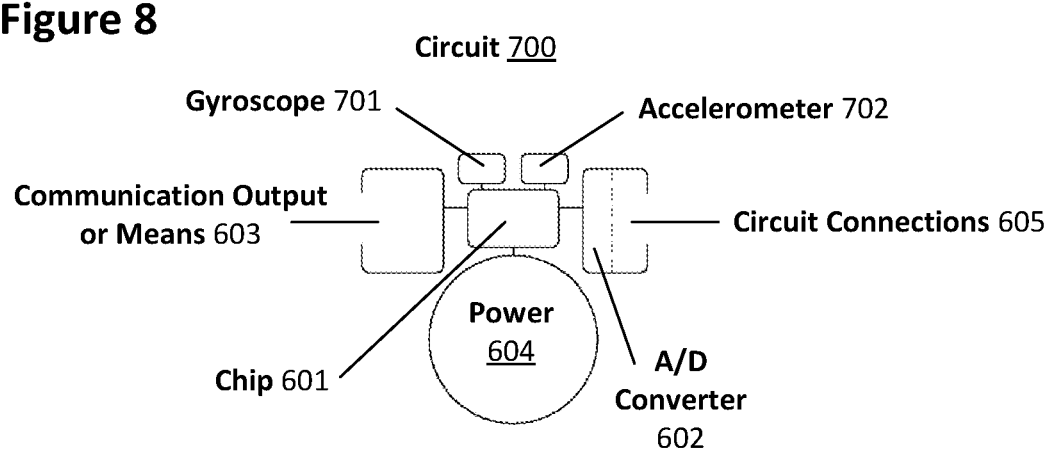
FIG. 8 shows another embodiment of a circuit for processing data provided by an integrated layering system.

FIG. 8 illustrates a circuit 700 including additional components compared to the circuit 600 of FIG. 7. Such a circuit 700 may be for use in helmets to capture complete biomechanical data and event data. In order to provide complete biomechanical data, additional sensors such as micro electromechanical systems (MEMS) may be incorporated as part of the circuit 600. Connected to the processing chip 601 may be a gyroscope 701 and an accelerometer 702. Preferably, a single component such as a single MEMs device is used, however multiple MEMS devices may optionally be used. These MEMS devices are particularly useful for providing information relating to the flow of force and movement. Such MEMS devices can also establish whether impact to the device/system occurred away from the device initially. In the case of a helmet incorporating or used with the device/system for example, the MEMS devices can establish whether impact to the helmet occurred away from the helmet initially, for example at another body part such as the lower back. The sequence of timed events established by the processing chip 601 may additionally record the gyroscope and accelerometer values, thereby enabling the data received therefrom to be mapped and plotted to understand movement and rotational impact/force on the device/system. In the specific case of a helmet incorporating or used with the device for example, the recording of gyroscope and accelerometer values enables the data received therefrom to be mapped and plotted to understand movement and rotational impact/force of the body, head and brain before, during and after the helmet impact event.

The circuit could also include a GPS unit to provide GPS information. For example, the GPS unit could provide a GPS location at the time of impact. This may also be controlled by the processing chip 601 such that, when the pre-determined threshold is exceeded, a GPS location is also logged.

The circuits 600 and 700 may also include integrated data storage means, such as a memory, and/or may include data storage receiving means, such as a port for receiving a micro SD multimedia card or any other form of removable data storage. In this manner, biomechanical data and event data, which may also include GPS data, can be stored by the circuits 600 and 700. Such storage may take place after it has been determined that an impact has exceeded the pre-defined threshold, and may include the data recorded before, at the time of, and after the impact as previously described. The stored data may also include any manually input data, for example specific personal or physical data, including medical information, relating to a user/wearer of the device. The stored data could alternatively be received from a mobile wireless communications device, or other computing device, in communication with the device/system in a conventional manner.

The complete event data and biomechanical data that may be captured are described as one or more of the following:

I. Time and date of impact
II. Location of linear impact(s)
III. Magnitude of linear impact(s)
IV. Magnitude of force transferred to an object, for example the head (if more than one device is used, for example the system 300)
V. Linear path force(s) takes through an object, for example the head
VI. Indication of rotational forces applied to an object, for example the brain
VII. Linear path force(s) takes through an object, for example the brain (after calculating rotational forces)
VIII. Speed of force(s) both linear and rotational
IX. Motion and movements of the device/system relative to another object, for example a helmet relative to the body, and a 'normal position' before, during and after impact to the head/helmet
X. Personal details and medical information (allergies, blood type, NHS number, next of kin etc.) of a wearer An example scenario will now be described for the purposes of outlining some of the benefits of the disclosed invention. For example, a cyclist is wearing a cycling helmet that incorporates the disclosed device/system. The side of a car hits the lower back of the cyclist. The values measured by the gyroscope and accelerometer alter at that specific time and continue to alter depending on the resultant movement of the cyclist's body and head. In this example, the cyclist is trajected into the air over the handlebars and the accelerometer combined with the gyroscope is able to provide readings that enable a determination of the likely rotational forces applied to the brain to be made. The cyclist misses the car but lands head first on the tarmac road. This registers an impact force to the helmet from the device. The impact force may only be registered if it exceeds a certain threshold. The sequence of events surrounding the impact is recorded before, at the time of impact and shortly after to capture all forces, motions, paths of force and magnitudes of force. This allows creation of a comprehensive biomechanical picture which is stored as data on the processing chip ready for data transfer to an external device.

The device/system may register more than one impact in the same event sequence. For example, if a second knock/impact occurred in a different location on the helmet, that would be recorded also along with the magnitude of force, location of impact and direction of linear path of force. In line with conventional cycling helmet guidelines, it would be recommended that the device/system should not be used following a single impact event that registers above a threshold. In this case, the helmet should be replaced. As a safety measure, a lower threshold can also be built into the device/system enabling an alert to be displayed if the lower threshold is exceeded. This would indicate that the helmet has received a knock/impact such as a user dropping the helmet on the floor. Sometimes hairline cracks can occur in energy management materials of the helmet making the helmet less effective. The use of a lower threshold therefore allows detection of such events, giving an indication that the helmet may have one or more hairline cracks or other defects.

The transfer of data from the device/system and the communication between the device/system and an external device can vary depending upon the application. Retrieval of information/data stored on the device/system can be via a mobile phone/blue tooth or a USB linked to a peripheral device or computer, as an example. This data can be interpreted on the spot for real time analysis such as in an emergency situation, or alternatively the data may be stored on a database for subsequent use. Data values for immediate reporting or visualisation can be presented as single values as data in a column, for example. The data shown may be one or more of the below:

XI. Time and date of impact
XII. Location of impact(s)
XIII. Magnitude of impact(s)
XIV. Magnitude of force transferred to the head
XV. Linear path force(s) takes through brain
XVI. Speed of force
XVII. Indication of rotational forces applied to brain (Y/N)
XVIII. Personal details and medical information (allergies, blood type, NHS number, next of kin etc.)

Preferably, the data values relating to the complete event are depicted visually through a short video animation including arrows indicating the rotational and linear forces exerted on the device/system with data values for I to X above. The animation may therefore show movements, motion and forces applied leading up to impact, during impact and after impact. This can be sent as a series of images, a single image or a short animation sequencing events. For more in depth analysis and interpretation of the data, some or all of the data may be transferred in raw format to be interpreted by software. For example, in the case of an impact to a helmet, the orientation and position of the brain might be slightly differently placed compared to what is considered a normal position within the head if rotational forces can be demonstrated. Therefore, the brain's location at the time when linear force was applied might not be in the normal position meaning that the linear path through the head could be plotted more accurately to show the actual path through the brain.

FIG. 9 shows two example screen shots of how this data may be displayed pictorially showing (II) location of linear impact(s), (V) linear path force(s) takes through the head, and (VII) linear path force(s) takes through the brain (after calculating rotational forces).

Preferably, the processing chip 601 also has personal details and medical information (allergies, blood type, next of kin etc.) stored thereon about the wearer of the helmet, which can be accompanied by the biomechanical information.

The processing chip 601, the communication output or means 603, the power source 604, the circuit connections 605, and optionally the A/D converter chip 602, the gyroscope 701 and the accelerometer 702 are preferably housed in a protective casing. The protective casing housing these components may be termed a black box 1000. The black box 1000 can be any size and shape and, if the communication output or means 603 is a USB connection point, appropriate connection points are made available through the protective casing/black box. Preferably, the communication output or means 603 is a USB since this could also be the recharge point for the power source 604.

Figure 11:
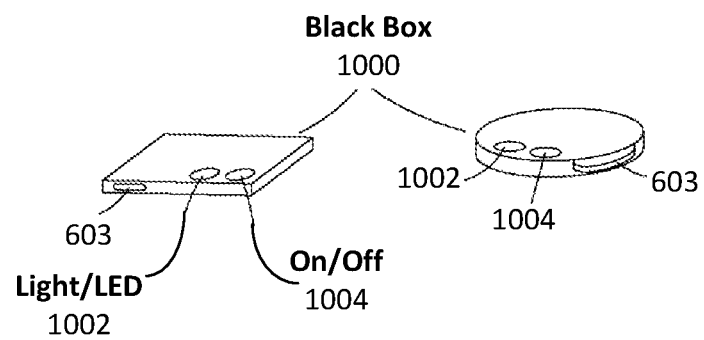
FIG. 11 shows two embodiments of a black box.

FIG. 11 illustrates two example shapes and sizes of the black box 1000, with differently configured black box circuits. Communication points as communication output or means 603 are shown, as well as optional light/LED 1002, power on/off 1004 location sites. Should an indicator light 1002 such as an LED be used, this would provide means to enable visibility by the user. The black box 1000 could be controlled by a mobile phone to power the circuitry on/off, or the black box 1000 may be connected to a computer for data download and to power on/off and recharge. Preferably, means are provided within the circuit to manually control power on/off 1004. Such means would be well known to the person skilled in the art, and therefore will not be described here.

The device/system disclosed herein comprises the combination of the layers and the black box. The components of device can be printed onto a small board, such as a PCB, which may be flexible, or preferably the components may be purchased off the shelf and located to a specially designed board. The black box 1000 permits any heat generated from the circuitry to be transferred away from a wearer of the apparel including or used with the device, for example heat may be transferred away from the head. If a casing is used, the casing may be soft, light and flexible and the material chosen can withstand high impact. Any suitable material may be used, such as silicon or even non-Newtonian foams/gels. The black box 1000 can be connected to the device/system.

In the case of the device/system being used as part of or with a helmet, preferably the location of the black box 1000 is at the back of the helmet towards the base and in the centre, and the size is preferably no more than ⅓ to half the size of a small matchbox and preferably less. Furthermore, as previously mentioned, optionally a light(s) 1002 such as an LED may be part of the black box circuit to visibly indicate the circuit power status. For example, the light 1002 being green may indicate that the circuit is fully operational and the power source 604 (such as one or more batteries) is charged. The light 1002 being amber may indicate that the circuit is fully operational with the power source 604 providing 'x' hours of power left. 'x' may be less than the number of hours provided by the power source 604 at full charge, for example 80%, or any other percentage less than 100%. The light 1002 flashing amber may indicate that the circuit is fully operational with the power source 604 providing 'y' time left (e.g. 60 minutes). "y" may be less than "x", for example 30% or any other percentage less than "x". The light 1002 being red may indicate that the circuit is not operating correctly. In the last scenario, the user can connect the black box 1000 or the helmet to a computer linked to the internet for evaluation by third party software. Remedial action can be taken depending upon the problem identified or advice given.

Figure 10A:
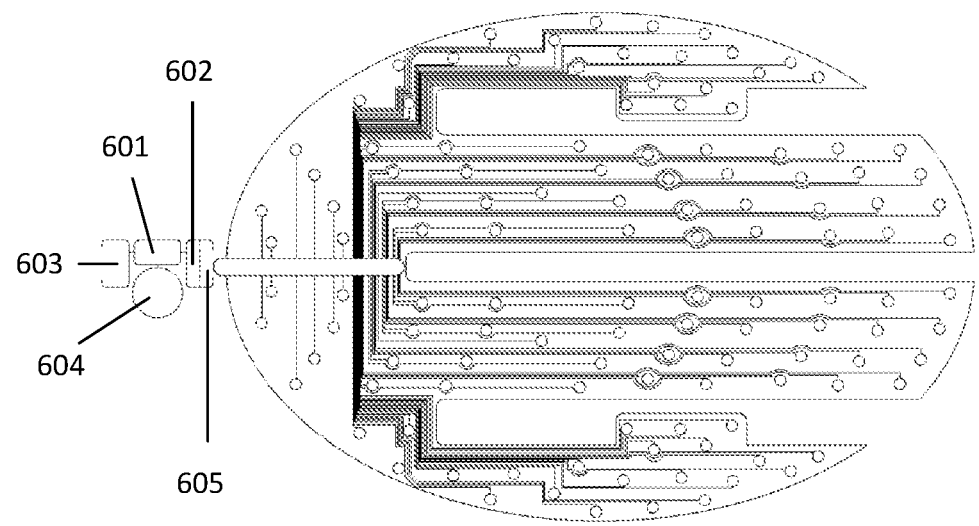
FIG. 10A shows an embodiment of an integrated layering system connected to the circuitry of a black box.
Figure 10B:
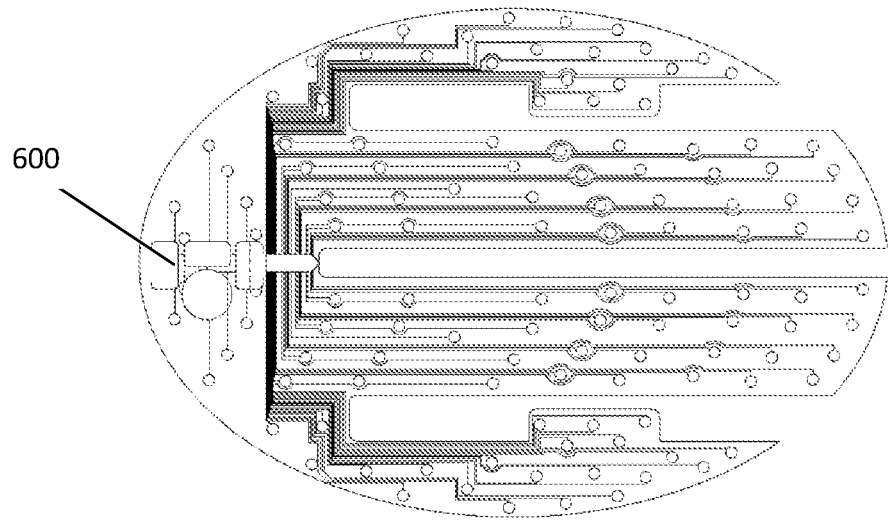
FIG. 10B shows another embodiment of an integrated layering system connected to the circuitry of a black box.

FIG. 10A shows an example of how the layers may be connected to the circuitry of the black box 1000. The circuit connections 605 may be any length. FIG. 1013 shows an example of a connection wherein the black box 1000 is located within the perimeter of the layers. This is particularly useful if only one set of layers is used (e.g. eight or more layers as opposed to two or more separate sets of three or four layers). The circuitry of FIGS. 10A and 1013 may optionally also include the gyroscope 701, the accelerometer 702, the indicator light 1002 and the power on/off 1004, and may be connected to one or more devices.

The device/system is particularly useful to analyse materials old and new for their energy management properties. The device/system also establishes the actual forces applied at the moment of impact ensuring continuity of testing. Devices can be located above and below the energy management materials being tested. An upper device, including an upper sensor layer, records values of the force and location of the impact onto the energy management material. A lower device, including a lower sensor layer, records forces exiting the energy management material, thereby providing clear comparative performance data. The system of multiple devices also identifies the path the force is taking through the material as previously described. For this application, devices may be sold separately as individual devices or in multiple packs. The device/system may connect to a black box 1000 as previously described. Optionally, the communication output or means 603 and the power source 604 may be connection points to receive power from an external source and to link directly to a computer. Alternatively, the device/system connection point may connect to alternative means which link directly to a computer.

Figure 12A:
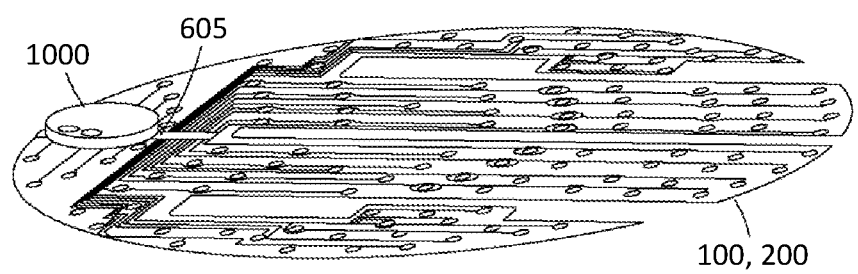
FIG. 12A shows an embodiment of a device comprising an integrated layering system and a black box.

FIG. 12A illustrates an example of a device comprising layers and the black box 1000. The layers and the black box 1000 are connected at the circuit connections 605. Such a device may be for integration within, or used in conjunction with, a helmet.

Figure 12B:
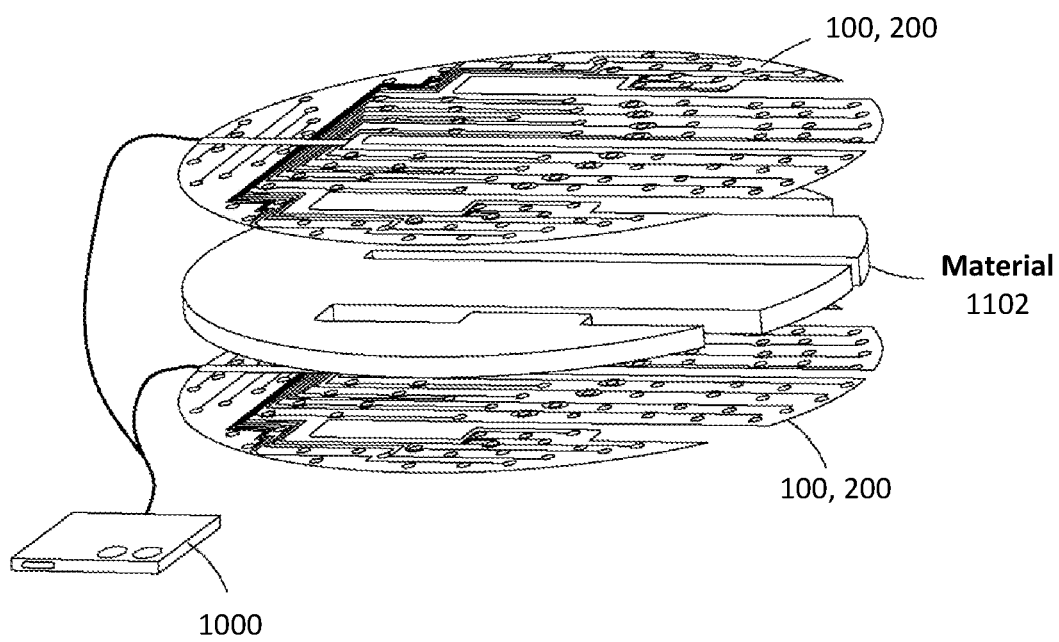
FIG. 12B shows an embodiment of a system comprising multiple integrated layering systems (multiple devices) and a black box.

FIG. 12B illustrates an example of a system comprising multiple devices and the black box 1000. Such a system may be for use with materials analysis and testing. The material 1102 to be tested is in between two devices which may be in any configuration as previously described (for example three, four, six, seven, eight, nine or more layers). The black box 1000 is either connected by the communication output or means 603 directly to a computer, or remotely using means such as a mobile phone or other mobile wireless communications device to receive interpreted data. Optionally, the power source 604 can be directly linked to a mains power supply.

The device and system disclosed herein can be applied across a plurality of varying disciplines and activities where use of helmets or other protective apparel or gear are beneficial to the safety and preservation of the person, athlete or hobbyist. Sports and recreational activities may include but are not limited to cycling, rock climbing, ice hockey, American football, motor sports, water sports, horse riding, kayaking, skiing, martial arts, boxing and the like. The invention disclosed herein can be used in conjunction with protective apparel including protective headwear, protective footwear, or any other protective apparel. The device could be formed as part of a skull cap (in the case of use with a helmet) or lining to be worn underneath protective apparel. It can also be used in commercial, occupational and/or professional situations such as in conjunction with hard hats on building sites or oil rigs. The type of helmet does not matter, neither does the level of rigidity or softness. The helmet can be a hard shell exterior e.g. American football, soft shell exterior e.g. cycling, or soft throughout, e.g. scrum cap for rugby. Particularly, the device and system disclosed herein could be used in boots or other equipment. Such a device and system may be placed inside a boot in order to measure the pressure applied to the boot by a foot of the wearer, for example, or could be used to measure external forces or pressures applied to the outside of the boot.

In the specific case of helmets, should an accident occur resulting in a Traumatic Brain Injury (TBI), the appropriate treatment of an acute brain injury is dependent on a number of key stages which include the pre-hospital admission phase, the initial triage phase and the subsequent intensive care and post intensive care treatment phases being on-going rehabilitation. Short term and longer term TBI problems can be mitigated by understanding more fully and accurately what happened at the time of impact to the head.

Through research and working with experts in the field of Paramedics, A&E and rehabilitative patient treatment and care it has been determined that TBI, particularly at the mild end of the severity spectrum, is one of the most challenging injuries to manage. Any opportunity to collect reliable, acute clinical information details to assist with the management of TBI at the time of impact is beneficial during the initial triage phase and subsequent stages. The captured information may also be used to help illustrate the flow and level of forces experienced leading up to the impact event and shortly after which can assist in determining responsibility and actual levels versus claimed levels of units/measurements (such as speed). Such information is helpful for insurance claims and medico-legal cases.

An example incident will now be described to illustrate a use of the invention. If a cyclist has an accident that causes sufficient impact to the head to warrant an emergency call, depending upon the level of severity the cyclist may suffer loss of consciousness or be too dazed and confused to recollect what happened. Furthermore, there may not be any witnesses present to provide an account. Even if there were persons present, they may be unable to provide important and accurate impact information regarding what happened.

When paramedics arrive on a crash scene, it is nearly always after the incident has taken place. One of their roles is to understand what happened to the victim/patient(s) as soon as possible and to rapidly assess the patient's condition. In order to receive the best possible care with any suspected head injury, it is beneficial to collate as much biomechanical information as possible in the shortest time possible, including but not limited to:

A. Mechanism of injury
B. Time of impact (airway assessment $O_2$ starvation, also beneficial in assisting with Glasgow Coma Scale (GCS) score)
C. Location of impact to the head
D. Force(s) and speed(s) of impact to the head (brain & neck)
E. Angle of force(s) to the head determining linear path (brain & neck)

One way that paramedics attempt to gather this information is to 'manage the scene' quickly by making observations, asking any witnesses what happened, stabilizing the patient and carefully removing the helmet from the cyclist. The damaged helmet can give a rough indication of where the impact was on the helmet. A known method of analysis in this situation is to observe the position of the helmet on the head and then make a visual assessment of any cracking and/or crushing to the helmet lining. This analysis would be in addition to looking at any fracture and/or scratching on the outer surface of the helmet, which might indicate the impact location and also indicate the severity of impact. With known helmet designs, this information is not accurate and takes time to assess properly; time which paramedics cannot necessarily afford. When situations are time critical, the paramedics' priority is to stabilize the patient and relay the assessment/observation information of the patient to the A&E department ahead of or on arrival. The paramedics on arrival at A&E can handover the helmet for further examination by A&E staff.

Unlike known systems and devices, the device/system disclosed herein is able to accurately provide the necessary important information which the paramedics can use to immediately interpret what happened to a wearer and then this information can be relayed ahead of arrival to A&E. The paramedics are able to access event data and biomechanical data (I to X, or, XI to XVII described above) via a mobile phone or ambulance on-board computer, for example, by connecting to the communication output or means 603 of the device, which may be a USB and/or wireless connection. The device and system disclosed herein therefore provides a more informed and accurate account of what happened very quickly without requiring the patient to be coherent or conscious, and without needing accurate witnesses present to provide information to paramedics on the crash scene.

The information can assist A&E staff in making decisions regarding tests and scans, observation and discharging the patient.

Additionally, the device and system disclosed herein can enable paramedics to be informed of vital data collected by the device/system before arrival to the scene as soon as a 999 (in the United Kingdom), 911 (in United States), or other like emergency telephone number call is made. Whoever makes the emergency call may, using means such as a mobile phone to retrieve the data from the device, provide the emergency services with such data.

The captured information can then assist A&E staff in making decisions regarding tests and scans, observation and discharging the patient. At this initial stage the information could also assist with police statements and witness accounts.

An example of how the device or system could assist in the medical triage phase and medico-legal disputes, in the context of its use as part of a helmet, will now be described. Regarding a medico-legal case which includes Traumatic Brain Injury, two (or more) parties are involved, the defendants insurance company and the solicitors representing the injured party or parties. In the very first instance, both sides need to establish the type of injury and severity, who is to blame for the injury and the portion of blame the defendants would be responsible for represented as a percentage. This is achieved by establishing the facts of the event, obtaining copies of any available recorded evidence of the accident, police statements and witness accounts, crash scene emergency staff accounts, medical reports, discharge notes etc. The more available data, the more clear the picture becomes and having a device that can capture event data and biomechanical data will assist in this process.

The next phase is determining the type and duration of rehabilitation, treatments, aids and the like in phased approaches to help the injured party. This is achieved by understanding, as accurately as possible, the specific aspects of the brain injury and level of severity. One of the issues is that MRI scans are not usually requested due to cost, and CT scans may show no organic damage and hide other serious problems. Such problems could have been identified had more information been available at the time. For example, understanding the location and linear path of the force can be used to establish which areas of the brain have probably been more affected. This means that a more accurate diagnosis for the patient relating to neurological (e.g. migraine) and neuropsychological aspects (Cognitive Behavioural Therapy and cognition therapy) is possible, and the subsequent time and rehabilitation costs for the defendants company can be saved. The same information will also help neuropsychologists support their examinations and test results. For example, experts often question why a patient scores very low in certain areas of the exam. Having the supporting biomechanical data would help explain the expert's findings.

The device and system may also be used to help the walking wounded, in cases that fall within the mild to medium head injury category (this represents the majority of head injuries). A diagnosis of symptoms pertaining to the accident, such as post traumatic chronic migraine from a neurologist, can come around one year after the accident. Up to this time, the patient could be suffering without any medication to help prevent migraine or reduce the effect of migraine when they attack. This is because a neurologist is unlikely to be part of the rehabilitation process if a CT scan shows no organic damage, although the patient could still be continually suffering from headaches. If the responsibility is with the defendants, they cover the costs of expert examination and often there is no medical reason that can be shown for a GP to refer a patient to a neurologist in the first six months.

With the device and system disclosed herein, which is able to capture biomechanical data showing the severity of force and path etc., a clearer indication of other problems can be considered. Therefore, an MRI scan might be justified or a referral to a neurologist could take place sooner. The neurologist could investigate and diagnose the primary headache causation and even identify a secondary headache, such as nummular headache (which would not normally be investigated at this early stage), brought about by a bashing of the nerves. Conditions are only identifiable through investigation at this early stage, and the information provided by the device can provide an early indicator or reason for such an investigation, particularly if the patient is complaining of specific problems. For the patient, this would mean receiving preventative medication to help treat relevant symptoms, thereby hopefully reducing the pain and suffering and leading to an accurate diagnosis more quickly and cheaply.

The last phase is establishing proof of certain problems that the opposition is in disagreement with. With supporting biomechanical and event data, medical reports containing false or speculative statements can be discounted more easily.

It is preferred that in whatever form the device/system is, the resulting protective apparel (gloves, boots, helmet or other) conforms to the relevant territory standards and compliance.

Peripheral options, third party products and other external devices can be connected to the device to receive biomechanical and event data information and/or interact with combinations of all or either the device 100, system 300, the black box 1000 and/or any other aspect of the device or system. Examples of such options are now described:

The device/system can interact with an application ("app") installed on a mobile wireless communications device, such as a mobile phone or tablet. Following an impact over a certain force/pressure threshold, data can be relayed to the mobile wireless communications device to generate an alert linked with the GPS location of the mobile wireless communications device. The application can automatically contact emergency services and relay the relevant information regarding the wearer of the device/system (such as a helmet). The application could stop making the call if the wearer of the device/system (such as a helmet) manually stopped the application's software sequence, meaning that the wearer was conscious and/or sufficiently aware to make their own decision. Equally, one or more alerts over a lesser force/pressure threshold could be received by the application to alert the wearer that the protective apparel (such as a helmet) has received an impact or been knocked in some way. In the example of a helmet, this could be the helmet being dropped, the alert therefore indicating that a helmet replacement could be considered.

The biomechanical and event information captured by the device or system can be collated in real time for an on-the-spot statistical analysis of sports players, for example in American football or rugby, or indeed any other sport. Coaches and/or referees can be alerted during games, for example, and the information could be used to assist in the assessment of any head injury received by a wearer of apparel including the device. In this scenario, one of the benefits of the information is that it would prove if the player had actually received an impact, for example an impact directly to the head.

The captured information could contribute to player analysis over time, which is helpful for coaches and managers to assess capability, performance and fitness levels. This could also help in player selection and transfer decisions and the like. This information can also be assessed by medical staff for medical health assessment of player. The data could also form part of a growing statistical database for clubs, individuals and the like to access.

Peripheral devices and additional sensors could be connected to the black box 1000 via Bluetooth and the like. For example, heart rate monitoring sensors could be connected. This could be useful in the case of cyclists, for example, or any other type of person in which it may be beneficial to measure heart rate. The black box 1000 could become the central point (hub) for monitoring the individual, receiving data which can be relayed in real time or transferred at the end of each day, for example. Alternatively, as another example in the case of the device or system being used with or as part of a helmet, one or more additional sensors integral to the helmet strap could indicate if the strap is not connected properly. To achieve this, such sensors could be connected to the black box 1000. Further, in the case of a helmet, the fact that one or more impacts have been recorded by the device or system (along with a time and date stamp) may serve as evidence that the helmet was worn by the wearer at a specific date and time.

Peripheral lights or light patches, formed of OLEDs for example, could be added to enhance safety of apparel incorporating the device or system. For example, there could be red light at the back and white light at the front of the apparel. In the case of cyclists or other endeavours in which lighting to increase visibility may be beneficial, the light at the front may even be bright enough to assist the cyclist in navigation. Such lights could be connected to the black box 1000, but located externally of the apparel, such as externally on the helmet.

The various functions of the device or system described above may be implemented by a computer program product. The software resident on the device that captured the data is an example of such a computer program product. The computer program product may include computer code arranged to instruct a computer or the device to perform the functions of one or more of the various functions described above. The computer program and/or the code for performing such functions may be provided to an apparatus, such as a computer or the device, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium, such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer or the device/system may be configured in accordance with such code to perform one or more processes in accordance with the various functions discussed herein. In one arrangement the apparatus comprises a processor, memory, and optionally a display. Typically, these are connected to a central bus structure, the display being connected via a display adapter. The system can also comprise one or more input devices (such as a mouse, keyboard or touchscreen) and/or a communications adapter for connecting the apparatus to other apparatus or networks. In one arrangement, a database resides in the memory of the computer system. Such an apparatus may take the form of a data processing system. Such a data processing system may be a distributed system. For example, such a data processing system may be distributed across a network.

The invention claimed is:

1. A device for detecting a force or pressure applied to an object, the device comprising:
   a first flexible substrate layer having a first plurality of pressure sensors thereon; and
   a first plurality of electrically conductive tracks;
   wherein the first plurality of electrically conductive tracks is arranged to provide an electrical connection to the first plurality of pressure sensors; and
   wherein the first plurality of electrically conductive tracks comprises a plurality of first electrodes and a plurality of second electrodes, each first electrode and each second electrode being in electrical contact with a single pressure sensor of the first plurality of pressure sensors.

2. The device of claim 1, further comprising:
   a second flexible substrate layer having a second plurality of pressure sensors thereon; and
   a second plurality of electrically conductive tracks, the second plurality of electrically conductive tracks being arranged to provide an electrical connection to the second plurality of pressure sensors.

3. The device of claim 2, wherein the second plurality of pressure sensors are in physical and electrical contact with the first plurality of pressure sensors.

4. The device of claim 2, wherein the second plurality of electrically conductive tracks forms a second tracks layer, the second plurality of pressure sensors comprise pressure sensitive ink, and the pressure sensitive ink comprises printed or screen coated pressure sensitive ink spots, the ink spots being arranged to change electrical resistance in response to pressure changes.

5. The device of claim 4, wherein the second tracks layer is located between the second flexible substrate layer and the second plurality of pressure sensors.

6. The device of claim 4, wherein the device is formed as a single layer comprising the following six layers: the first flexible substrate layer, the first plurality of pressure sensors as a first sensor layer, the first plurality of electrically conductive tracks as a first tracks layer, the second flexible substrate layer, the second plurality of pressure sensors as a second sensor layer, and the second plurality of electrically conductive tracks as a second tracks layer.

7. The device of claim 4, further comprising one or more dielectric layers to provide electrical insulation between the first plurality of electrically conductive tracks and the second plurality of electrically conductive tracks.

8. The device of claim 1, wherein the object is a helmet.

9. The device of claim 1, wherein the device is arranged to form an inner lining of a helmet.

10. The device of claim 1, wherein the object is a body part of a wearer of the device.

11. The device of claim 10, wherein the body part is a head.

12. The device of claim 10, wherein the body part is a foot.

13. The device of claim 1, wherein the device is arranged to form part of an insole for footwear.

14. The device of claim 1, integrated into footwear or an insole.

15. The device of claim 1, integrated into a helmet.

16. The device of claim 1, integrated into clothing.

17. A system comprising two of the devices according to claim 1, one device being a first device and the other device being a second device, wherein the system further comprises a gap layer arranged between the first and second devices.

18. The system of claim 17, wherein the system further comprises a processor, the processor being configured to determine an angle or direction of a detected force or pressure based on a comparison of data received from the first device and data received from the second device.

19. The system of claim 18, wherein the processor is further configured to determine a magnitude of a force or pressure transferred through the gap layer, based on a comparison of the data received from the first device and the second device.

20. The system of claim 18, wherein the processor is further configured to determine a change in direction of force through the gap layer, based on a comparison of the data received from the first device and the second device.

21. The system of claim 18, wherein the processor is further configured to determine a magnitude and location of a force or pressure impact based on data received from the first device, and determine a magnitude and location of a force or pressure exiting the gap layer based on the data received from the second device.

22. A device for detecting a force or pressure applied to an object, the device comprising:
   a first flexible substrate layer having a first plurality of pressure sensors thereon; and
   a first plurality of electrically conductive tracks;
   wherein the first plurality of electrically conductive tracks is arranged to provide an electrical connection to the first plurality of pressure sensors; and
   wherein the first plurality of pressure sensors comprises pressure sensitive ink.

23. The device of claim 22, wherein the pressure sensitive ink comprises printed or screen coated pressure sensitive ink spots, the ink spots being arranged to change electrical resistance in response to pressure changes.

24. The device of claim 22, further comprising:
   a second flexible substrate layer having a second plurality of pressure sensors thereon; and
   a second plurality of electrically conductive tracks, the second plurality of electrically conductive tracks being arranged to provide an electrical connection to the second plurality of pressure sensors.

25. The device of claim 24, wherein the second plurality of pressure sensors are in physical and electrical contact with the first plurality of pressure sensors.

26. The device of claim 24, wherein the second plurality of electrically conductive tracks forms a second tracks layer, the second plurality of pressure sensors comprise pressure sensitive ink, and the pressure sensitive ink comprises printed or screen coated pressure sensitive ink spots, the ink spots being arranged to change electrical resistance in response to pressure changes.

27. The device of claim 26, wherein the second tracks layer is located between the second flexible substrate layer and the second plurality of pressure sensors.

28. The device of claim 26, wherein the device is formed as a single layer comprising the following six layers: the first flexible substrate layer, the first plurality of pressure sensors as a first sensor layer, the first plurality of electrically conductive tracks as a first tracks layer, the second flexible substrate layer, the second plurality of pressure sensors as a second sensor layer, and the second plurality of electrically conductive tracks as a second tracks layer.

29. The device of claim 26, further comprising one or more dielectric layers to provide electrical insulation between the first plurality of electrically conductive tracks and the second plurality of electrically conductive tracks.

30. The device of claim 22, wherein the object is a helmet.

31. The device of claim 22, wherein the device is arranged to form an inner lining of a helmet.

32. The device of claim 22, wherein the object is a body part of a wearer of the device.

33. The device of claim 32, wherein the body part is a head.

34. The device of claim 32, wherein the body part is a foot.

35. The device of claim 22, wherein the device is arranged to form part of an insole for footwear.

36. The device of claim 22, integrated into footwear or an insole.

37. The device of claim 22, integrated into a helmet.

38. The device of claim 22, integrated into clothing.

39. A system comprising two of the devices according to claim 22, one device being a first device and the other device being a second device, wherein the system further comprises a gap layer arranged between the first and second devices.

40. The system of claim 39, wherein the system further comprises a processor, the processor being configured to determine an angle or direction of a detected force or pressure based on a comparison of data received from the first device and data received from the second device.

41. The system of claim 40, wherein the processor is further configured to determine a magnitude of a force or pressure transferred through the gap layer, based on a comparison of the data received from the first device and the second device.

42. The system of claim 40, wherein the processor is further configured to determine a change in direction of force through the gap layer, based on a comparison of the data received from the first device and the second device.

43. The system of claim 40, wherein the processor is further configured to determine a magnitude and location of a force or pressure impact based on data received from the first device, and determine a magnitude and location of a force or pressure exiting the gap layer based on the data received from the second device.

* * * * *